J. C. SCHMITT.
CONFECTION MOLDING MACHINE.
APPLICATION FILED JAN. 2, 1917.
1,297,917.
Patented Mar. 18, 1919
3 SHEETS—SHEET 1.
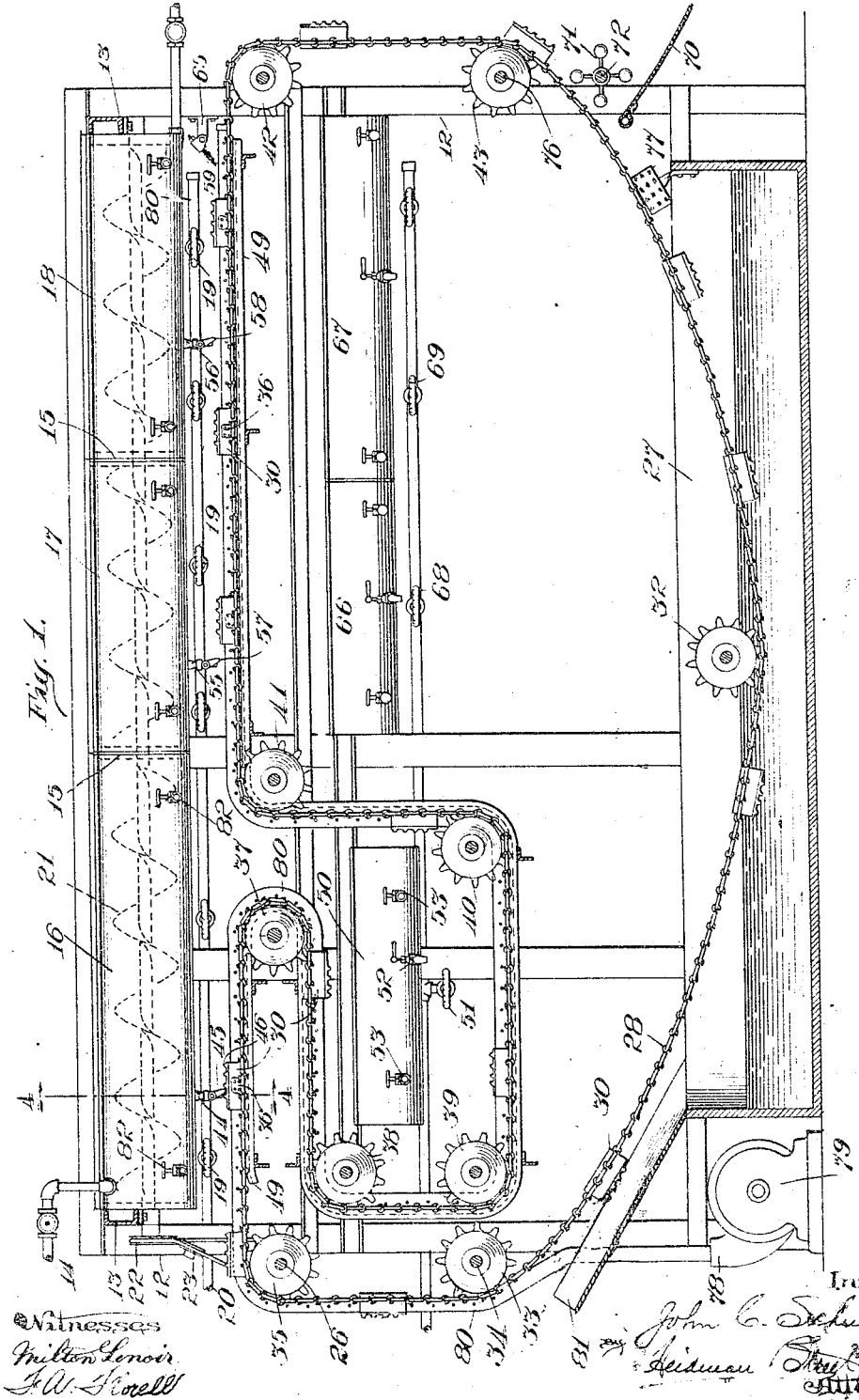

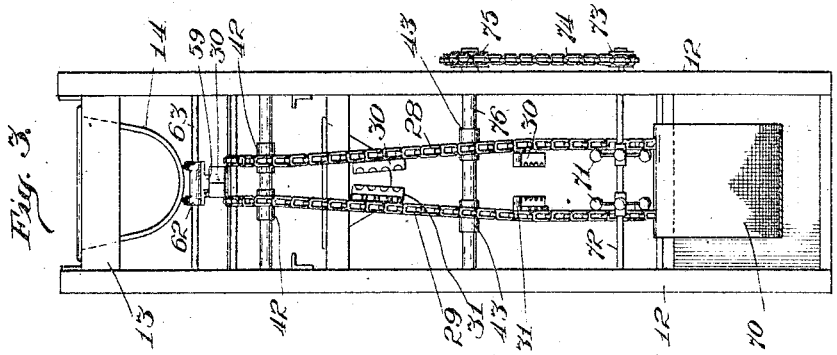

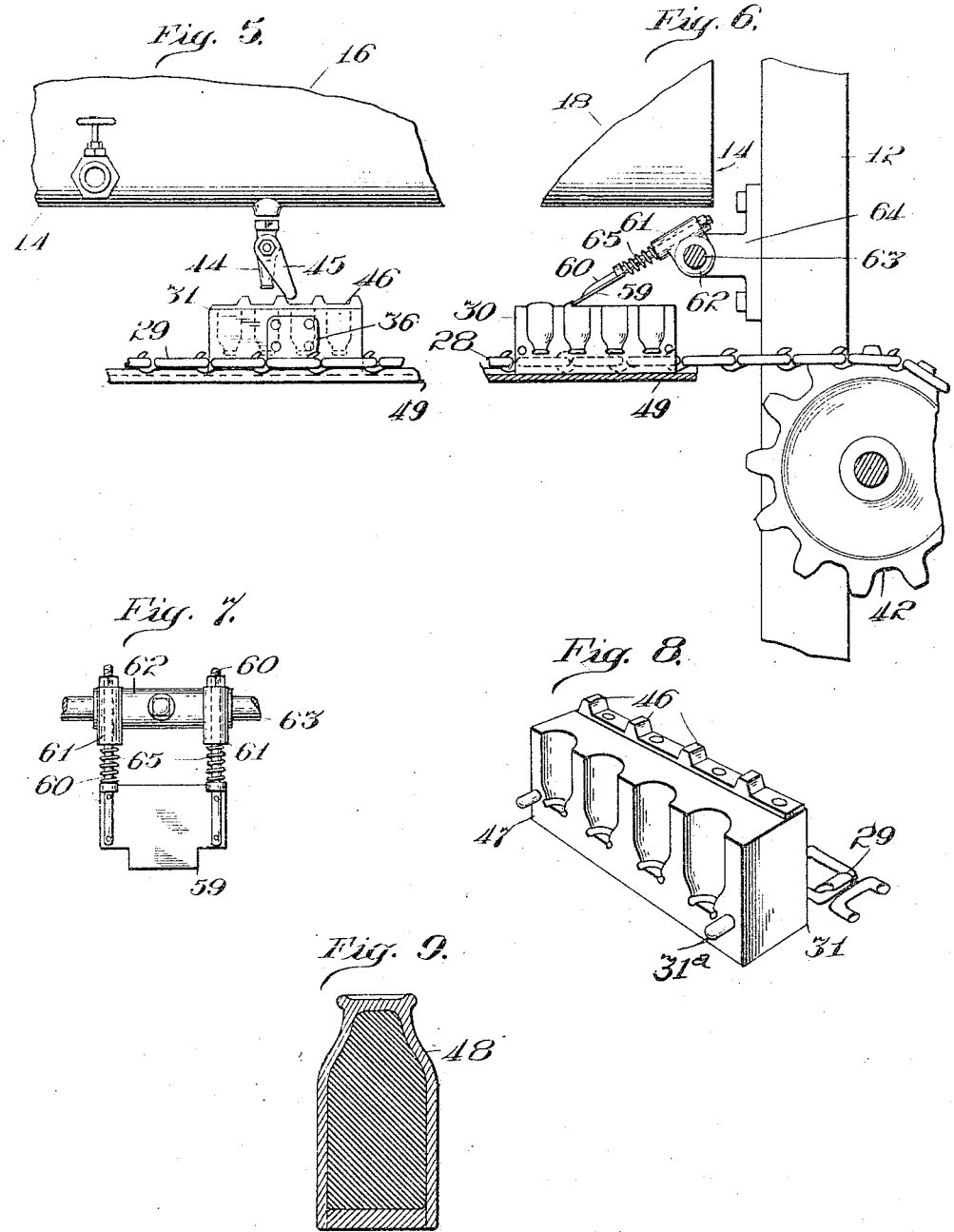

UNITED STATES PATENT OFFICE.

JOHN C. SCHMITT, OF CHICAGO, ILLINOIS.

CONFECTION-MOLDING MACHINE.

1,297,917.   Specification of Letters Patent.   Patented Mar. 18, 1919.

Application filed January 2, 1917. Serial No. 140,087.

*To all whom it may concern:*

Be it known that I, JOHN C. SCHMITT, a citizen of the United States, and resident of Chicago, in the county of Cook and State of Illinois, have invented a certain new and useful Improvement in Confection-Molding Machines, of which the following is a description, reference being had to the accompanying drawings, which form a part of my specification.

My invention relates to what may be termed a wax specialty machine more especially intended for use in the manufacture of confections, namely confections which are incased with a covering of plastic substance, as for example a coating of suitable wax. The machine to which my invention relates contemplates the production of confectionery novelties in various molded forms, to wit in the shape of bottles or other devices, the interiors whereof are provided with a suitable syrup or liquid confection; the container or molded wax casing, after the syrup or confection has been introduced being then hermetically sealed, preferably with wax, or other plastic substance of which the container is formed, so that the contents will be properly protected and yet at the same time easily accessible.

The object of my invention, as exemplified in the drawings, is to provide a construction whereby the outer casing or shell of the article or novelty is formed, the syrup or liquid confection introduced, and the opening in the shell or casing, through which the syrup was introduced, sealed by the operation of a single machine through which the novelty or shell-forming molds are automatically driven or carried in an endless or continuous manner; the shell-forming molds being preferably made in sections and secured to parallelly arranged endless belts or members.

Where the machine is intended for the manufacture of confectionery novelties, as disclosed in the accompanying drawings and description, the molds are initially immersed in or passed through a tank of suitable oil while the mold-sections are in a separated condition; the mold-sections then brought into registering or abutting relation beneath a fluid wax-containing trough or tank; the proper positioning of the registered mold-sections, or closed molds, automatically controlling the wax discharge into the molds. The wax-containing molds are then continued in their travel through the machine so as to assume an inverted condition, whereby the surplus fluid or hot wax will be discharged while the wax in contact with the inner walls of the mold will become chilled, adhere thereto and thereby provide a suitable coating or molded shell within the mold.

The molds provided with the wax-coating are then brought into receiving relation with a syrup or liquid confection holding container, where the proper positioning of the mold will automatically control the discharge of the syrup into the mold. The filled molds, having the molded wax and syrup, are then passed forward to a second wax-holding receptacle where the sealing of the open end of the wax shell or casing within the mold is effected, while further travel or movement of the endless carriers or belts results in the discharge of the completed article or novelty from the molds.

The purpose of my invention is to provide a machine wherein all of the operations, as above enumerated, to wit the operations of oiling the molds, of wax or shell forming, the filling of the shells with a fluid confection, the sealing of the open end of the molded shell, and discharging of the completed article, are automatically performed by a single machine during a complete travel of the molds.

The above specified objects and the advantages inherent in my improved construction will be more readily comprehended from the following detailed description of the accompanying drawings, wherein :—

Figure 1 is a longitudinal sectional view of my improved machine, with the main portions thereof disclosed in side elevation.

Fig. 2 is an end elevation thereof, to wit the left-hand end of the machine as illustrated in Fig. 1.

Fig. 3 is an end elevation of the opposite or right-hand end of the machine shown in Fig. 1.

Fig. 4 is a vertical sectional view, taken on the line 4—4 of Fig. 1.

Fig. 5 is a detail view in side elevation, with portions broken away, of the mechanism disclosed in Fig. 4.

Fig. 6 is a fragmentary view in side elevation of the upper right-hand corner of the machine shown in Fig. 1, illustrating the scraper for dislodging the excess wax or sealing element employed after the confection has been introduced into the mold.

Fig. 7 is a detail view in side elevation of the scraper mechanism shown in Fig. 6.

Fig. 8 is a detail perspective view of one-half or section of a type of mold that may be employed in my machine.

Fig. 9 is a vertical sectional view of the wax novelty or molded article produced by the particular type of mold illustrated in the drawings.

In the particular exemplification of the invention, the wax and syrup containing receptacles or troughs are preferably disposed at the top of the machine. The machine comprises any suitable frame composed of the uprights 12 and suitable number of cross-members 13, all properly secured together in any convenient and proper manner; the cross-members 13 being adapted to provide suitable support for the wax and syrup-holding trough 14, see Figs. 1, 2 and 3. The wax and syrup-holding receptacles may constitute a single trough having any suitable formation that will permit of a complete and ready drainage thereof; the trough being preferably provided with the semi-cylindrical bottom, as shown in Figs. 2 and 3, and provided with partitions 15, placed at proper intervals intermediate of the ends of the trough so as to divide the trough or receptacle into a suitable number of compartments; the compartments 16, see Fig. 1, being intended to contain the liquid wax or other suitable plastic material; the compartment 17 being intended to contain the syrup or liquid confection; while the third compartment 18 is intended to contain liquid wax or other suitable plastic material.

The trough or receptacle 14 is preferably provided with a double wall or outer jacket in order to provide a steam-containing chamber throughout the length of the trough; suitable steam inlet and outlet ports being provided at opposite ends of the trough and connecting with a source of steam supply; the hot steam heating the trough and maintaining the contents of the different compartments of the receptacle or tank at proper temperature and therefore in fluid condition. In order that other means may be had for heating the trough, I prefer to provide a suitable number of gas burners beneath the trough, as indicated at 19, which may also be employed to assist in heating the tank or receptacle; the burners 19 being fed, for example, by a single gas pipe or conduit indicated at 20 in Fig. 2 and provided with a suitable valve for controlling the flow of gas.

The tank is shown provided with a suitable agitator, preferably in the nature of a spiral 21 arranged on a shaft extending throughout the entire length of the trough or receptacle 14 so as to stir up the contents of all compartments and maintain a more or less uniform temperature of the entire mass. The spiral shaft 21 is suitably mounted in the ends of the trough, with one end of the shaft protruding therethrough and provided with a pulley or sprocket-wheel 22, see Fig. 2, having a belt 23 which passes about the idlers 24 and around a pulley 25 mounted on a shaft 26 having suitable bearings in the frame members 12 at the left-hand end of the machine illustrated in Fig. 1 and as shown in Fig. 2.

Preferably arranged at the bottom of the machine is a tank or receptacle 27 provided with a suitable oil, such as petrolatum, through which the endless members or chains 28 and 29 are adapted to pass in their travel throughout the machine. The members or chains 28 and 29 are each provided with correlated mold-sections 30 and 31, secured to the chains so as to be brought into register with each other during a major portion of travel through the machine. In order to insure a positive, registering relation between the correlated mold-sections, dowel or registering pins may be provided on the inner face of either one or both mold-sections; as, for example, in Fig. 8, the mold-section 31 is shown provided with a pair of dowel pins 31$^a$ adapted to extend into suitable holes formed in the correlated mold-section 30, in accordance with the usual practice.

The tank 27 is provided with a suitable roller or sprocket 32 beneath which the endless members or chains 28 and 29 are compelled to pass; the chains being then led toward the left-hand in Fig. 1 about suitably arranged sprockets 33 mounted on a shaft 34 having proper bearing in the frame-members 12 so as to permit the shaft to rotate. The mold-sections 30 and 31 are mounted on the adjacent sides of the chains so as to permit the mold-sections to be brought into abutting or registering relation with each other as the chains, with the molds carried thereby, are brought up out of the oil tank 27, illustrated for example in Fig. 2. The chains 28 and 29, with their respective mold-sections 30 and 31 are passed upward over the sprockets or pulleys 25 mounted on shaft 26, at which time the molds will be presented upwardly as shown in Fig. 1. The mold-sections 30 and 31 are each provided with a suitable bracket 36 preferably secured to the side of the mold-sections at an intermediate point, see Fig. 5, and to a single link of the chains in order that the same may pass about the various sprocket wheels or pulleys during the continuous travel of the endless members or chains.

The endless members or chains, with the molds, continue over the sprockets 35, passing beneath the trough-section or chamber 16, about the pulleys or sprockets 37, thence rearward and about pulleys or sprockets 38, and down around the sprockets or pulleys 39. From pulleys 39 the endless members pass forward again in a horizontal direction and upward about the pulleys or sprockets 40 to the sprocket wheels or pulleys 41, at which point the endless members, with the molds, will be caused to travel in a horizontal direction beneath the chambers 17 and 18 of trough 14, thence around sprockets 42, down about the sprockets 43 and into the oil tank or chamber 27 and about the sprockets 32, which may be considered the point of beginning or initial starting point.

The various sprocket wheels for the two endless members or chains, with the exception of the sprocket wheels 43 and 32, are so arranged as to maintain the endless members or chains in close parallel relation so as to hold the respective mold-sections in abutting relation with each other, or, in other words, in closed condition so as to retain the fluid wax, or other liquid which has been discharged into them to be molded or formed thereby. The pair of sprocket wheels 43, however, are spaced farther apart, as more clearly disclosed in Fig. 3, so as to separate the chains or carriers and therefore also the mold-sections, as shown in said figure. Upon the complete separation of the mold-sections, induced by the sprockets 43, the molded contents will be discharged therefrom as the molds become inverted in their passage down toward the tank.

The separated condition of the endless members and mold-sections is preferably maintained for a major portion of their travel through the oil tank or chamber 27, in order that the mold-sections may not only be properly cleaned, but also thoroughly oiled on the inner surfaces of the mold-sections, preparatory to receiving the melted wax contained in the chamber 16. The sprocket wheels 33 are so arranged that the endless members or chains, with their respective mold-sections, will be brought into close relation, as disclosed in Fig. 2, as the chains and mold-sections pass from the oil tank or chamber 27; the mold-sections being in abutting relation with each other so as to form a complete mold before they are brought beneath the first wax-holding chamber 16.

The wax-holding chamber 16, at a suitable point, is provided with a discharge port or outlet 44, controlled by a suitable valve, which is preferably automatically operable and normally shuts off the flow through the discharge 44. The valve of the discharge 44 is controlled by a lever 45 adapted to be tripped or operated by suitable projections or lugs 46 formed on or secured to one of the mold-sections, as, for example, the mold-section 31, see Figs. 4 and 5. The projections or lugs 46 on the mold-sections 31 are so placed, relative to the orifices in the molds, that the lever 45 will be tripped or operated sufficiently by the time the orifices of the molds are brought beneath the discharge spout 44.

In the particular exemplification of the invention, the molds are disclosed in the nature of two correlated blocks each being provided with a number of half matrices or patterns, closed at the bottom, as shown at 47 in Fig. 8, where the matrix or pattern, for illustration, is shown in the nature of one-half of an inverted bottle; the complete mold producing the bottle 48 disclosed in Fig. 9. The bottom or larger end of the pattern, to wit the bottom of the bottle formation, is preferably presented upwardly so as to permit the liquid to readily flow into the mold.

As previously stated, the wax is kept in a proper heated condition in the trough-chamber 16 in order that it may readily flow through the discharge spout 44 and into the mold when the latter has been brought into proper relation with the discharge spout. In order to insure the close relation between the mold-sections and also maintain them in proper relation with the discharge spout during the travel of the molds, I prefer to provide a suitable shoe or support 49, supported in any suitable manner on the frame of the machine. The shoe or support 49 is formed so as to engage the sides as well as the bottoms of the molds, thereby holding the mold-sections in close contact with each other; the shoe or support being mounted so as to extend parallel with the chains or endless members and preferably substantially throughout the entire travel of the molds, namely from a point slightly in advance of the first discharge spout 44 to a point beyond the discharge spout of chamber 18, see Fig. 1.

After the mold has passed beneath the discharge spout 44 and the various matrix or pattern portions of the mold have been filled, the endless members or chains with the mold-sections pass about the sprockets 37, (where two endless chains are employed, the various sprocket-wheels are arranged in pairs) and thence backward across the sprockets 38, at which time the mold will be on the lower side of the endless members or chains until they come intermediate of the sprockets 39 and 40.

The molds are preferably made of metal and maintained in a cool state, so that the wax, immediately adjacent the inner walls of the mold, will be chilled thereby and form a thin coating on the inner surface, while the major and unchilled portion of the wax will be allowed to discharge through the open end of the mold during the passage of the molds in the inverted position intermediate of the pulleys 37 and 38. At the point where the molds pass between sprockets 37 and 38, I provide a suitable receptacle or tank 50 to receive the discharged unchilled wax from the molds. The receptacle or tank 50 is also preferably provided with a steam jacket like trough 14 having suitable steam inlet and outlet, and additional heating means may be provided, as for example the burners 51 disposed longitudinally beneath the tank. The tank is provided with a suitable discharge spout as for example at 52, provided with a suitable cock or valve, to permit the wax to be withdrawn from the receptacle or tank 50 and transferred to the other wax-receiving chambers. The tank or receptacle 50 is shown provided with suitable steam inlet and outlet ports 53 at opposite ends thereof so as to permit circulation of steam throughout the jacket; the ports are provided with suitable valves. Like trough 14, this tank is also preferably provided with cleanout ports at suitable points to permit the tank to be cleaned from time to time.

After the molds have been passed across the auxiliary wax-receiving trough or tank 50 and the surplus wax discharged from the molds, the latter, with their thin coating of wax adhering to the interior side walls or matrixed surfaces, are then passed down about the sprockets 39 and across to sprockets 40, so as to bring them into the upright position occupied at the time of their travel beneath the wax chamber 16, namely with the molds on the upper side of the endless members or chains so as to present the open ends of the molds upwardly at the time of their travel about the sprocket wheels 41, and, therefore, at the time of their travel beneath the confection or syrup-holding chamber 17 as well as the wax or sealing element holding chamber 18. The supporting ledge or member 49, which extends throughout the travel of the molds intermediate of sprockets 35 and sprockets 42, will insure the molds being held in proper relation with the chambers 17 and 18 to receive the matter discharged therefrom, see Fig. 1. The chambers 17 and 18, like chamber 16, are each provided with similar discharging spouts 55 and 56, respectively, having automatically closing valves adapted to be tripped or operated by the passage of the molds, through the action of the projections or lugs 46 contacting with the levers 57 and 58, respectively. As the molds are brought beneath the discharge 55 of chamber 17, the upper ends of the molds receive the liquid confection or syrup from chamber 17. The chamber 18 is provided with heated or molten wax, like chamber 16, so that when the molds are brought beneath discharge 56 and lever 58 operated by the projections or lugs on the molds, the upper or open ends of the molds will receive molten wax on top of the syrup, adapted to seal the open ends of the forms or molds. In the particular exemplification, this seal will constitute the bottom portions of the bottle formation shown in Fig. 9. The exposure of the wax to the atmosphere, as well as to the blast of air discharged onto the molds by air conduit 80, which follows the travel of the molds from sprockets 38 to a point in proximity with sprockets 42, will cause the wax to quickly chill or congeal. The discharge from chamber 18 will leave a slight excess on top of the molds, as more clearly indicated in Fig. 6. In order to provide a perfectly smooth bottom to the molded form, and therefore remove the excess wax to a point flush with the top of the mold, I provide a suitable scraper or knife 59 which is preferably shown in the nature of the blade-portion, see Figs. 6 and 7, secured to the short rods 60 which extend through suitable sleeves 61 formed on the collar 62 mounted on a suitable shaft 63 and preferably held in place by a set screw or other suitable means; the shaft 63 being supported by a suitable bracket 64 secured to the frame of the machine. I prefer to provide a yielding relation between the scraper or knife 59 and the molds, and for that reason provide the rods 60 with the coil springs 65, see Figs. 6 and 7, at a point intermediate of the sleeves 61 and the knife or scraper blade 59. As is evident from the construction shown and described, the rods 60 are free to move lengthwise through the sleeves 61 through any upward pressure against the scraper or knife; the blade or scraper being held in operative relation with the top of the mold through the action of springs 65.

I provide the machine with a suitable trough immediately beneath the discharge spouts 55 and 56, in order to receive any excess syrup or confection and excess molten wax discharged respectively from the spouts 55 and 56; the trough being divided into separate chambers 66 and 67; the chamber 66 being adapted to receive the excess syrup, while chamber 67 receives the excess wax or other sealing material. The receptacles 66 and 67 may consist of a single trough divided into separate chambers, or they may consist of separate troughs as desired; and these chambers are also preferably steam-jacketed and also adapted to be heated by suitable burners 68 and 69, respectively, as shown in Fig. 1; both chambers or troughs being provided with suitable steam-ports and discharge spouts.

After the filled and sealed molds have passed the scraper or knife 59, they continue in their travel about the sprockets 42 and downwardly about sprockets 43, and thence into the oil tank 27 and about sprockets 32. The sprockets 43 are arranged in separated relation with each other so that the endless members or chains, with their respective mold-sections, will be moved apart, causing the molds to be opened as disclosed in Fig. 3, which will permit the molded form or matter to drop out of the molds and onto the discharge chute 70, see Fig. 1. The chute 70 is extended beneath the sprockets 43 and is preferably provided with a covering of canvas or other suitable fabric so as to prevent injury to the material in dropping onto the chute.

In order to insure the contents of the molds discharging therefrom, I prefer to provide suitable tappers or "knockers" 71, see Figs. 1 and 3, arranged along the path of the molds at a point intermediate of the sprockets 43 and chute 70. The tappers or "knockers" 71 are secured to a suitable shaft 72 mounted in the frame of the machine and rotated by means of a sprocket or chain, as, for example, the sprocket 73 secured to the end of the shaft 72 and chain 74 which passes about a suitable sprocket 75 secured to the end of the shaft 76 on which sprockets 43 are mounted. The tappers or "knockers" 71 may be of any suitable construction, as for example the radially disposed arms, preferably enlarged at their ends as shown in Fig. 3, and so arranged as to be moved into tapping relation with the sides of the mold-sections without, of course, interfering with the passage of the mold-sections in their travel toward the oil tank 27. In practice, it has been found that where the molded matter adheres to the molds, it can be readily released by a slight tap on the mold.

At a point where the molds enter the oil tank or chamber 27, to wit at the right hand end thereof, I provide a suitable brush, preferably a double faced brush, as shown at 77, Fig. 1, adapted to come into contact with the inner or matrixed surfaces of the mold-sections, and cause the same to be thoroughly cleaned of any particles that might adhere thereto.

In order to insure the proper temperature of the mold-sections, or, in other words, to properly chill the mold-sections, I provide a suitable blower 78 which may be operated by an electric motor 79 which may also drive the endless members or chains, as well as the rotating spiral or agitator 21 extending throughout the length of the composite trough or receptacle 14. The blower 78 is provided with a suitable pipe or conduit 80 arranged along the path of the traveling molds from the oil tank or trough to a point in proximity with the scraper or knife 59. The side of the conduit or pipe 80, presented toward the molds, is provided with a plurality of openings, so that the air forced into the conduit 80 will be discharged across the path of the molds and therefore against the molds while the latter are traveling through the machine to a point preferably beyond the discharge spout of the wax-holding chamber 18; the end of the conduit 80, of course, being closed so that the air forced into the conduit by the blower 78 will be discharged in a multiple of small jets or streams onto the passing molds, thereby insuring the proper chilling or temperature of the molds previous to receiving and throughout the time the wax and contents are contained therein. The chilling of the molds, as previously described, causes the molten wax, in contact with the inner surfaces of the molds, to immediately cool or congeal, and thus assume the configuration of the matrixed surfaces of the molds while the interior or major portion of the wax will still remain in a molten or fluid condition and thus be permitted to flow out of the respective molds when the latter are brought into an inverted position while traveling intermediate of sprocket wheels or pulleys 37 and 38.

In order to catch the drip from the endless members and molds, as the same are leaving the oil receptacle or tank 27, the end of tank or receptacle 27 may be provided with a suitable shield as at 81, see Figs. 1 and 2, which will permit the surplus oil to drain back into the oil chamber or tank.

The composite trough or chambered receptacle 14 may be provided with clean-out ports at suitable points so that the various chambers may be cleaned from time to time, as, for example, indicated at 82 in Figs. 2 and 4; the clean-out ports being provided with suitable valves.

The projections or lugs 46 may either be formed integral with one of the mold-sections, or be formed on a separate strip or member secured to the mold-section in any suitable manner, as illustrated, for example, in Fig. 8.

The construction shown and described is believed to be the simplest embodiment of my invention, but it is apparent that modifications in certain details may be made without, however, departing from the spirit of my invention.

What I claim is:—

1. A machine of the class described, comprising an oil chamber, plastic material and confection-holding receptacles provided with valved outlets, a pair of endless members arranged in parallel relation and adapted to travel through said oil chamber and in proximity to the valved outlets of said receptacles, a plurality of sectional molds arranged in juxtaposition on both endless members, means whereby the mold-sections are maintained in registering relation throughout the major portion of travel along said race-way, means carried by one portion of the mold sections whereby the valved outlets of the receptacles are controlled when the molds reach predetermined points in their travel so as to receive the material discharged from said receptacles, means whereby the respective mold-sections are moved into separated relation with each other, and means whereby the separated mold sections are vibrated and the molded material discharged therefrom.

2. A machine of the class described, comprising an oil chamber, plastic material and confection-holding receptacles provided with valved discharges, a pair of parallelly arranged endless members adapted to travel through said oil chamber and into proximity with the valved discharges of the receptacles, a plurality of correlated mold-sections mounted on both endless members, means arranged on some of the mold-sections adapted to control the valved discharges when the molds reach predetermined points in their travel along said race-way, and means whereby said endless members and their respective mold-sections carried thereby are moved into separated relation and the molded contents discharged.

3. A machine of the class described, comprising an oil chamber, plastic material and confection-holding receptacles provided with valved outlets, means whereby the temperature of the receptacles is controlled, a pair of endless members arranged to travel through said oil chamber and into proximity with the valved outlets of said receptacles, each of said endless members being provided with a plurality of correlated mold-sections, means whereby the correlated mold-sections are maintained in juxtaposition throughout the major portion of their travel with the endless members, means whereby the valved outlets are controlled when the molds reach predetermined points in their travel, and means whereby the endless members, with their respective mold-sections are moved into separated relation and the molded contents discharged from said molds.

4. A machine of the class described, comprising material holding receptacles provided with valved discharges, a pair of endless members adapted to travel in a circuitous manner through said machine and into proximity with the valved discharges of said receptacles, each endless member being provided with a plurality of correlated mold-sections, said endless members being arranged to maintain the correlated mold-sections in juxtaposition with each other throughout a major portion of their travel through the machine, a portion of the travel of said endless members being such that the molds will be held in an inverted position and excess material permitted to discharge from the molds, and means arranged along the path of said molds for controlling the temperature thereof.

5. A machine of the class described, comprising material holding receptacles provided with valved outlets, a pair of endless members arranged to travel in a circuitous path through said machine, each endless member being provided with a plurality of correlated mold-sections, the endless members being arranged so as to maintain the correlated mold-sections in juxtaposition with each other throughout a major portion of their travel, the mold-sections being provided with means for controlling the valved discharges when the molds reach predetermined points in their travel, said endless members being arranged to carry the molds in an inverted position throughout a portion of their travel so as to permit excess material in the molds to be discharged therefrom, and means whereby the endless members and mold-sections are moved into separated relation with each other and the molded contents discharged.

6. A machine of the class described, comprising material-holding receptacles provided with valved discharges, a pair of endless members adapted to travel in a circuitous manner through the machine and in close proximity to the valved discharges, each of said endless members being provided with a plurality of correlated mold-sections maintained in juxtaposition with each other throughout the major portion of their travel, said endless members being arranged to travel in a reverse direction relative to the major portion of travel so as to cause the molds to assume an inverted position and thereby permit excess material to be discharged therefrom, means arranged beneath said portion of travel for receiving the excess discharged from the molds, means whereby the valved outlets are controlled when the molds reach predetermined points in their travel with the endless members, and means for controlling the temperature of said molds.

7. A machine of the class described, comprising an oil chamber, plastic material and liquid-confection holding chambers, the plastic material and liquid-confection holding chambers being provided with valved outlets, means adapted to travel through said oil chamber and into close proximity with the valved outlets of the other mentioned chambers, sectional molds carried by said means at successive intervals apart, means intermediate of the said valved outlets and the first-mentioned means whereby the valved outlets are controlled when the respective molds are brought into juxtaposition with said valved outlets, said first-mentioned means with the molds mounted thereon being adapted to move through a path where the molds will be held in inverted position and excess material discharged therefrom, excess material-receiving members mounted beneath the path where the molds are held in inverted position, means adapted to contact with the upper surfaces of the molds so as to remove excess material therefrom, said means being arranged at a point beyond the last-mentioned valved outlets, means whereby the first-mentioned means and mold-sections are moved into separated relation and the molded contents discharged, means mounted along the path of said molds adapted to have striking engagement with the molds so as to remove the contents therefrom, and means beyond said last-mentioned point adapted to clean the inner matrixed surfaces of said mold-sections.

JOHN C. SCHMITT.

Witnesses:
 GEORGE HEIDMAN,
 F. A. FLORELL.